United States Patent
Mani et al.

(10) Patent No.: US 11,951,715 B2
(45) Date of Patent: Apr. 9, 2024

(54) FILM LAMINATE AND INTERIOR TRIM PART FOR MOTOR VEHICLES

(71) Applicant: Benecke-Kaliko AG, Hannover (DE)

(72) Inventors: Joseph Mani, Eislingen (DE); Volker Huelsewede, Deggingen (DE)

(73) Assignee: Benecke-Kaliko AG, Hannover (DE)

( * ) Notice: Subject to any disclaimer, the term of this patent is extended or adjusted under 35 U.S.C. 154(b) by 640 days.

(21) Appl. No.: 16/824,230

(22) Filed: Mar. 19, 2020

(65) Prior Publication Data

US 2020/0215800 A1 Jul. 9, 2020

Related U.S. Application Data

(63) Continuation of application No. 15/767,659, filed as application No. PCT/EP2016/065632 on Jul. 4, 2016, now abandoned.

(30) Foreign Application Priority Data

Oct. 15, 2015 (DE) ..................... 10 2015 220 034.5

(51) Int. Cl.
 *B32B 27/06* (2006.01)
 *B29C 44/12* (2006.01)
 (Continued)

(52) U.S. Cl.
 CPC ............ *B32B 27/065* (2013.01); *B29C 44/12* (2013.01); *B29C 44/1214* (2013.01);
 (Continued)

(58) Field of Classification Search
 CPC .......... B32B 27/065; B32B 5/20; B32B 7/02; B32B 9/02; B32B 9/025; B32B 9/046;
 (Continued)

(56) References Cited

U.S. PATENT DOCUMENTS

2002/0121730 A1 9/2002 Ohlinger et al.
2003/0197302 A1* 10/2003 Kakarala ............. C08L 23/0815
 525/240
 (Continued)

FOREIGN PATENT DOCUMENTS

DE 10018196 A1 11/2001
DE 102007002230 A1 7/2008
 (Continued)

*Primary Examiner* — S. Behrooz Ghorishi
(74) *Attorney, Agent, or Firm* — Richard A. Wolf; Gregory Adams

(57) ABSTRACT

The invention relates to a film laminate, including at least one compact decorative layer with a lacquer layer on the upper side and with a foam layer on the underside, where the density of the foam layer is more than 500 kg/m$^3$. The invention further relates to the use of said film laminate for the coating of components for the interior trim of motor vehicles and to interior trim parts of motor vehicles provided with said film laminate. The foam layer is based on a composition which includes from 15 to 60 parts by weight of at least one thermoplastic vulcanizate, from 15 to 35 parts by weight of at least one high melt strength polyolefin, and from 30 to 60 parts by weight of at least one low density polyethylene (LDPE).

20 Claims, 1 Drawing Sheet

(51) Int. Cl.
    *B29C 44/34* (2006.01)
    *B32B 5/20* (2006.01)
    *B32B 7/02* (2019.01)
    *B32B 9/02* (2006.01)
    *B32B 9/04* (2006.01)
    *B32B 25/04* (2006.01)
    *B32B 25/08* (2006.01)
    *B32B 25/14* (2006.01)
    *B32B 25/16* (2006.01)
    *B32B 27/08* (2006.01)
    *B32B 27/32* (2006.01)
    *C08J 9/00* (2006.01)
    *C08J 9/08* (2006.01)

(52) U.S. Cl.
    CPC ...... *B29C 44/1285* (2013.01); *B29C 44/3446* (2013.01); *B29C 44/35* (2013.01); *B32B 5/20* (2013.01); *B32B 7/02* (2013.01); *B32B 9/02* (2013.01); *B32B 9/025* (2013.01); *B32B 9/046* (2013.01); *B32B 25/042* (2013.01); *B32B 25/045* (2013.01); *B32B 25/08* (2013.01); *B32B 25/14* (2013.01); *B32B 25/16* (2013.01); *B32B 27/08* (2013.01); *B32B 27/32* (2013.01); *C08J 9/0061* (2013.01); *C08J 9/08* (2013.01); *B32B 2250/02* (2013.01); *B32B 2255/10* (2013.01); *B32B 2266/025* (2013.01); *B32B 2266/0292* (2013.01); *B32B 2270/00* (2013.01); *B32B 2307/54* (2013.01); *B32B 2307/582* (2013.01); *B32B 2451/00* (2013.01); *B32B 2605/00* (2013.01); *B32B 2605/003* (2013.01); *C08J 2201/024* (2013.01); *C08J 2207/00* (2013.01); *C08J 2323/06* (2013.01); *C08J 2323/12* (2013.01); *C08J 2323/16* (2013.01); *C08J 2423/00* (2013.01); *C08J 2423/06* (2013.01); *C08J 2423/12* (2013.01)

(58) Field of Classification Search
    CPC ..... B32B 25/042; B32B 25/045; B32B 25/08; B32B 25/14; B32B 25/16; B32B 27/08; B32B 27/32; B32B 2250/02; B32B 2255/10; B32B 2266/025; B32B 2266/0292; B32B 2270/00; B32B 2307/54; B32B 2307/582; B32B 2451/00; B32B 2605/00; B32B 2605/003; B29C 44/12; B29C 44/1214; B29C 44/1285; B29C 44/3446; B29C 44/35; C08J 9/0061; C08J 9/08; C08J 2201/024; C08J 2207/00; C08J 2323/06; C08J 2323/12; C08J 2323/16; C08J 2423/00; C08J 2423/06; C08J 2423/12
    See application file for complete search history.

(56) References Cited

U.S. PATENT DOCUMENTS

| | | | |
|---|---|---|---|
| 2004/0014891 | A1* | 1/2004 | Krabbenborg .......... C08L 23/10 525/240 |
| 2008/0132645 | A1* | 6/2008 | Muyldermans ....... C08L 67/025 525/190 |
| 2009/0269538 | A1 | 10/2009 | Buhring et al. |
| 2009/0304973 | A1 | 12/2009 | Buehring |
| 2009/0317603 | A1 | 12/2009 | Bühring et al. |
| 2012/0001179 | A1 | 1/2012 | Yamazaki |
| 2012/0258303 | A1* | 10/2012 | Buhring ................. B32B 27/12 156/244.11 |
| 2012/0295086 | A1 | 11/2012 | Baldwin |
| 2013/0280517 | A1* | 10/2013 | Buehring ............. B29C 65/002 521/134 |
| 2015/0044405 | A1 | 2/2015 | Kaneno |
| 2015/0045464 | A1 | 2/2015 | Okumura et al. |
| 2015/0045468 | A1 | 2/2015 | Onodera |
| 2018/0272663 | A1 | 9/2018 | Mani et al. |

FOREIGN PATENT DOCUMENTS

| | | |
|---|---|---|
| EP | 1674530 A1 | 6/2006 |
| EP | 2117881 A1 | 11/2009 |
| EP | 3362278 A1 | 8/2018 |
| GB | 2241665 A | 9/1991 |
| JP | 2002036347 A | 2/2002 |
| JP | 2010513053 A | 4/2010 |
| JP | 2014172307 A | 9/2014 |
| WO | 2013161714 A1 | 10/2013 |
| WO | 2013114996 A1 | 5/2015 |

* cited by examiner

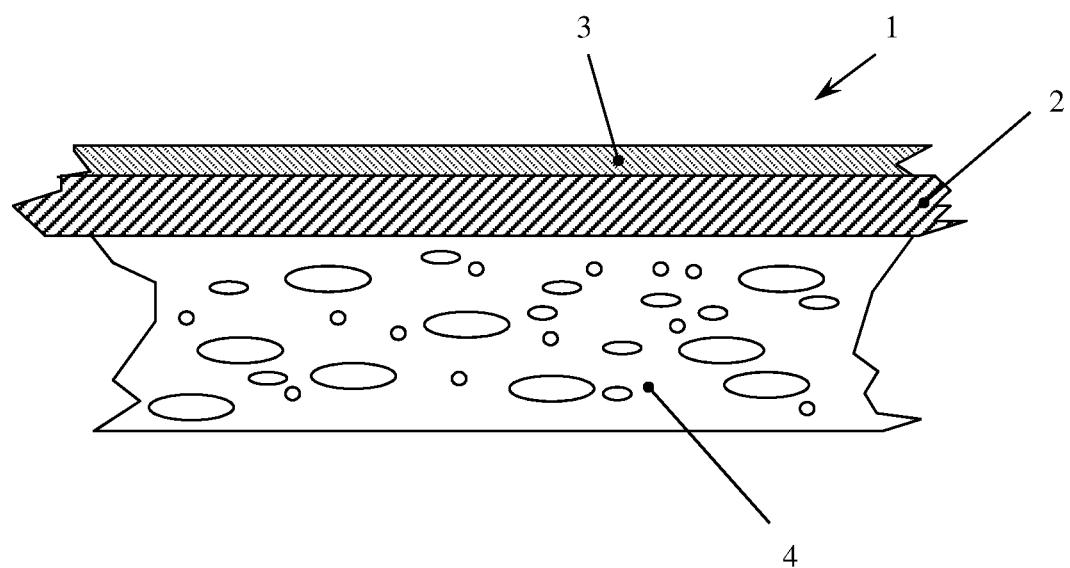

FILM LAMINATE AND INTERIOR TRIM PART FOR MOTOR VEHICLES

CROSS-REFERENCE TO RELATED APPLICATIONS

This application is a continuation application of U.S. patent application Ser. No. 15/767,659, filed Apr. 12, 2018.

TECHNICAL FIELD

The invention relates to a film laminate, comprising at least one compact decorative layer with a lacquer layer on the upper side and with a foam layer on the underside, where the density of the foam layer is more than 500 kg/m$^3$. The invention further relates to the use of said film laminate for the coating of components for the interior trim of motor vehicles and to interior trim parts of motor vehicles provided with said film laminate.

BACKGROUND

There are in essence two types of structure used at present in the field of decorative polyolefin-based sheet materials.

For applications and components in which the sheet material is subjected to severe stretching (e.g. up to 300%) in downstream thermal forming processes it is preferable to use compact film structures which may be composed of a plurality of layers. Compact films of this type based on polyolefins are described by way of example in DE 10018196 A1. Production of an interior trim part of a motor vehicle, for example a dashboard, begins with use of the positive or negative thermoforming process to thermoform the film. In a second processing step, a foam, generally a PUR-based foam, is subsequently applied to the back of the resultant "skin", and this foam is bonded to a stable carrier element.

For applications and components in which the sheet material is subjected to a low degree of stretching (e.g. <200%) in downstream thermal forming processes it is possible to use sheet materials with at least one foamed layer, known as foam film laminates. These consist of a single- or multiple-ply compact decorative film (lacquer layer and decorative layer) bonded to, as lower layer, a foamed material based on polyolefins. In this case, production of an interior trim part of a motor vehicle, for example a dashboard, begins with use of the positive or negative thermoforming process to thermoform the foam film laminate. An adhesive is then used to bond the resultant "skin" to the stable carrier element. The advantage of these latter foam laminates is that they can be processed in a single-stage process to give a molded foamed component with the desired softness (desired haptic properties) provided via the foam. When the former compact type of film structure is used, this can be achieved only by using a procedure in which foam is applied to the back of the material after thermoforming.

The polyolefin-based decorative sheet materials are used to produce components for automobile interiors, inter alia dashboards, by the thermoforming process. If film laminates are used in components which comprise an airbag function, the film laminates have to exhibit a required tear behavior where deployment of the airbag takes place within defined prescribed times, no particles are ejected, and passenger protection is ensured. The current prior art ensures the above by providing a weakened area (preferential fracture site) on the reverse side of the foam film laminate, generally by laser-cutting. These preferential fracture sites are either visible directly after they are introduced or become visible during the subsequent use of the component. This visibility has been perceived as a serious optical defect. Purchase and operation of the machines for introducing the lines of weakness moreover incur additional costs, and for this reason foam film laminates have hitherto been only seldom used for components with airbag function.

SUMMARY

The abovementioned polyolefin-based decorative sheet materials are generally produced by using a mixture of linear polymers, for example polyethylene and polypropylene. Sheet materials made of the above are provided with lines of weakness. Another factor requiring consideration with these materials is avoidance of what is known as "ballooning" with the risk of ejection of particles. Again, this can be avoided by using predetermined lines of weakness.

DETAILED DESCRIPTION

The object underlying the invention is thus to provide a film laminate which can be used as interior trim part of motor vehicles, in particular in the region of airbag covers, and which requires no lines of weakness. At the same time, the film laminate is intended to be amenable to processing in the thermoforming process, i.e. the stability of the film laminate is intended to be adequate for thermal forming processes with a degree of stretching of up to 300%.

The object is achieved via a film laminate of the type mentioned in the introduction, where the foam layer is based on a polymer composition which comprises:
a) from 15 to 60 parts by weight of at least one thermoplastic vulcanizate (TPV)
b) from 15 to 35 parts by weight of at least one high melt strength polyolefin (HMS polyolefin) and
c) from 30 to 60 parts by weight of at least one low density polyethylene (LDPE),
where the proportions of a), b) and c) give a total of 100.

Thermoplastic vulcanizates (TPV) here are crosslinked thermoplastic elastomers.

For the purposes of this invention, high melt strength polyolefins (HMS polyolefins) are polyolefins with high melt strength (high melt strength polyolefin). HMS polyethylene and HMS polypropylene have an elongational viscosity of $10^4$ to $10^7$ Pas at 190° C., a Hencky Strain Rate of 0.1 s$^{-1}$ and a Hencky Strain of 3.0. HMS polyolefins of this type are obtainable commercially from various producers. They are highly branched and have the property of being more viscous at low shear rates than polymers that have identical molecular weight but a lower degree of branching, while exhibiting a more pronounced decline in viscosity at high shear rates.

The expression "low density polyethylene (LDPE)" means polyethylenes with density from 0.915 to 0.935 g/cm$^3$ in accordance with ASTM D1505 and with weight-average molar mass Mw of from 20000 to 500000 g/mol, measured by GPC.

For the purposes of this invention, the expression "compact layers or films" means layers or films with density greater than 800 kg/m$^3$. Compact layers are in particular unfoamed layers. Densities of foam layers are generally less than 800 kg/m$^3$. However, the density of the foam layer in the invention is more than 500 kg/m$^3$, preferably from 500 to 700 kg/m$^3$.

Surprisingly, a film laminate with this type of foam film can be used in the thermoforming process to produce, for the interior trim of motor vehicles, a component which has tear behavior complying with airbag-opening requirements, without any need for subsequent weakening of the film laminate or of the component. There is thus firstly no visible line of weakness that is considered to be a design defect. Secondly, the component producer avoids costs relating to the purchase and operation of machines for introducing lines of weakness.

The tensile strain of the film laminates at the airbag testing temperatures of −30° C., 20° C. and 85° C. can be significantly reduced via the inventive composition of the foam layer, while at the same time thermoformability extending as far as a degree of stretching of up to 300% is retained. This may be due to presence, in the foam layer, of a degree of phase-incompatibility which influences tensile strain behavior in longitudinal direction and also in transverse direction at airbag testing temperatures. The rubber fractions in the thermoplastic vulcanizate serve as spherical "phase disrupters" which minimize flow behavior of the other polymers with respect to one another. At airbag testing temperatures, the highly branched high melt strength polyolefins and the low density polyethylenes are in non-molten form, and, by virtue of the highly branched structure, permit interlatching of the polymer chains. Surprisingly, the tensile strain behavior and tear behavior achieved at airbag testing temperatures exhibits smaller differences in longitudinal direction and transverse direction. This is important for obtaining an intended shape of the airbag-flap tear. "Ballooning" is prevented. In contrast, thermoforming takes place at temperatures starting at 170 up to 200° C. At these temperatures, crystalline phases of the high melt strength polyolefins and of the low density polyethylenes are melted and thus permit the required tensile strain for thermoforming with a high degree of stretching.

The polymer composition for the foam layer can comprise other conventional constituents, for example blowing agents, lubricants, stabilizers, fillers, for example inorganic fillers, and/or pigments.

Particularly good tensile strain behavior, in particular at high temperatures, which is almost isotropic, can be achieved if the foam layer is based on a polymer composition which comprises:
a) from 35 to 45 parts by weight of at least one thermoplastic vulcanizate (TPV)
b) from 15 to 25 parts by weight of at least one high melt strength polyolefin (HMS polyolefin) and
c) from 35 to 45 parts by weight of at least one low density polyethylene (LDPE),
where the proportions of a), b) and c) give a total of 100.
These compositions additionally have the advantage of high low-temperature flexibility.

The polymer composition for the foam layer comprises at least one high melt strength polyolefin. It is also possible to use a blend of a plurality of high melt strength polyolefins. In an advantageous embodiment of the invention, the high melt strength polyolefin is a high melt strength polypropylene. There are advantages here in respect of processing behavior.

The polymer composition for the foam layer comprises at least one thermoplastic vulcanizate. It is also possible to use a blend of a plurality of thermoplastic vulcanizates. A particularly favorable effect on tensile strain behavior and tear behavior, with suitability for an airbag cover, is achieved if the thermoplastic vulcanizate is based on polypropylene and ethylene-propylene-diene elastomer (EPDM).

The foam layer of the film laminate can be foamed chemically via addition of a solid chemical blowing agent in the polymer composition, or else physically.

In respect of low consumption of materials during production, and good tensile strain behavior, a feature of the film laminate is that the thickness of the lacquer layer is less than 10 μm, the thickness of the compact decorative layer is from 0.2 to 0.7 mm and the thickness of the foam layer is from 0.5 to 2.0 mm. The thickness of the decorative layer here provides a good grain effect and high scratch resistance.

The compact decorative layer can be a layer of plastics material or a layer of leather, preferably a plastics layer. For the compact decorative layer it is possible by way of example to use a conventional leather- or plastics-based sheet material. The leather or plastic of the compact decorative layer can comprise conventional additives, for example, lubricants, stabilizers, fillers, for example inorganic fillers, and/or pigments.

To the extent that the compact decorative layer is a plastics layer, the plastic can by way of example be polyolefin, in particular thermoplastic polyolefin (TPO), polyurethane (PU), for example thermoplastic polyurethane (TPU), polyvinyl chloride (PVC) or a combination of two or more thereof, particular preference being given here to TPO. Thermoplastic polyolefins (TPO) are widely used.

Examples of polyolefins are polyethylene (PE), polypropylene (PP) and mixtures of polyethylene (PE) and polypropylene (PP).

The term "polyethylene (PE)" here means polymers or copolymers comprising a proportion of more than 50% by weight of ethylene. The term "polypropylene (PP)" here means polymers or copolymers comprising a proportion of more than 50% by weight of propylene.

The film laminate of the invention has a lacquer layer on the smooth or three-dimensionally structured surface of the decorative layer. The lacquer layer can be advantageous for improving surface properties, for example, in respect of optical properties or of scratch resistance. The lacquer layer can be applied to the surface by conventional measures. The lacquer layer is preferably a polyurethane lacquer layer.

The film laminate can have, preferably on the underside, other layers alongside the layers mentioned. There can therefore by way of example be another foam layer arranged on the underside of the foam layer.

It is moreover possible that, provided to the underside of the foam layer, there is an adhesive layer or a primer. The adhesive layer or primer can serve as adhesive-bonding layer or adhesion promoter for improving or permitting bonding of the foam film laminate to the component or to a carrier to which, respectively, the laminate is to be attached.

The film laminate is produced by conventional processes, generally in that the compact decorative layer is extruded and a lacquer layer is provided thereto. The foamed layer is preferably formed by foam extrusion, and foam can be achieved physically here ($H_2O$ or inert gases) or with use of chemical blowing agents. The layers are then bonded, for example thermally or by adhesive bonding, to give a sheet material, thus producing a film laminate with a compact decorative layer and with a foam layer. It is also possible that the lacquer layer is applied after the bonding of the other two layers.

These sheet laminates are further processed to give components.

The prior art reveals various processes for forming components with a three-dimensionally structured surface. An example here is the "in-mold graining process (IMG process)", which is a specialized process that has developed from the negative thermoforming process. This in-mold graining process is probably best described as "negative thermoforming with graining". Unlike the standard thermoforming process in which the three-dimensional geometric structure is molded into the component by introducing, into the film, a thermoforming ram that forms the subsequent shape of the component, in the negative thermoforming process a film is drawn, for example by vacuum, into a female mold. Negative thermoforming with graining here is a particular embodiment of negative thermoforming in which not only the geometric structure of the component but also the subsequent grain structure is introduced in negative form into the mold surface.

The film laminate of the invention is particularly suitable for, and directed to, the production of components by the IMG process or by the positive thermoforming process.

The laminates produced for the positive thermoforming process can be subjected to a crosslinking step, preferably after introduction of the three-dimensional surface structure, in particular to electron beam crosslinking.

The laminate can be crosslinked by use of high-energy radiation, preferably electron beams. This leads to very good grain stability in positive thermoforming and to very good thermoforming properties. The irradiation leads to crosslinking in the plastic.

The shape of the film laminate can correspond to a component, and the component shape is preferably obtainable here via use of a shaping process step to apply the film laminate to a carrier corresponding to the shape of the component. In addition to the thermoforming process, for example the abovementioned processes, for the application of the laminate to a carrier, e.g. to a dashboard carrier, there are many other forming processes, for example compression processes or press processes, in which the film is pressed against molds or against the carriers mentioned and acquires its component shape. Examples of ways of providing the desired shape to the sheet are thermoforming, in-mold graining and low-pressure molding.

It is preferable to use the film laminate for the coating of components for the interior trim of motor vehicles, in particular at least in the region of the airbag covers or in the region of the tear seams of the airbag covers.

The invention accordingly also provides the use of the film laminate of the invention for the coating of components, preferably of components for the interior trim of motor vehicles, for example a dashboard, in particular for coating in the region of the airbag covers and/or in the region of the tear seams of the airbag covers.

The invention moreover provides an interior trim part for a motor vehicle, preferably a dashboard, to which a film laminate of the invention has been applied. It is particularly preferable that the film laminate has been applied at least in the region of the airbag covers and/or in the region of the tear seams of the airbag covers.

BRIEF DESCRIPTION OF THE DRAWING

FIG. 1 is a diagram of a film laminate according to an embodiment of the disclosure.

DETAILED DESCRIPTION

The invention will now be explained in more detail with reference to an inventive example, and the single FIG. 1 here is a diagram of the film laminate 1 of the invention with a compact outer layer 2. The thickness of said layer is 0.5 mm. Located on the outer layer 2 there is a lacquer layer 3 with thickness 7 µm. Located under the outer layer 2 there is the foam layer 4 with the specific polymer composition. The thickness of said layer is 1.0 mm. The film can be used for cladding a motor vehicle dashboard in the region of the passenger airbag. The film laminate 1 has an embossed three-dimensionally structured surface on the decorative layer 2, i.e. a grain applied externally by an embossing roll.

This type of film laminate can be used for the region of airbag covers in interior trim of motor vehicles, with no necessity to provide lines of weakness. It can be processed in thermoforming processes with a high degree of stretching.

Table 1 below lists examples of the polymer compositions for a foam layer 4 with properties thereof (only the foam layer, not the laminate), where I indicates the compositions of the invention and C indicates the comparative mixtures. Tensile strength and tensile strain at break were determined in accordance with DIN 527-3 in longitudinal direction (longitudinally) and transverse direction (transversally) at temperatures relevant for airbag performance. Longitudinal direction and transverse direction here are perpendicular to one another, longitudinal direction being defined as the direction of film production (direction of rolling, direction of extrusion), and transverse direction being defined as the direction perpendicular to the direction of production. The terms tensile strain at break and elongation at break are used synonymously. Test velocity was about 0.2 m/s.

The falling-ball test was carried out in accordance with VDA 237-101 from a height of 230 mm at −35° C.

The ingredients were as follows:
TPV: PP/EPDM blend with 70% by weight of EPDM, MFI 3.0 g/10 min (230° C./2.16 kg), softening point about 165° C.
HMS PP: structurally isomeric-modified propylene homopolymer, MFI=10.0 g/10 min at 230° C.; 2.16 kg, melt strength 7 cN at an elongation rate of 250 mm/s measured at a temperature of 200° C.
LDPE: Low density polyethylene, MFI=1.9 g/10 min at 190° C.; 2.16 kg; melt strength=34 cN at an elongation rate of 200 mm/s measured at a temperature of 200° C.
Blowing agent masterbatch: Hydrocerol 592 (60% by weight of polyethylene and 40% by weight citrates)
Stabilizer: UV stabilizer (HALS—sterically hindered phenol)
Pigment: black colorant made of 85% by weight of polyethylene and 15% by weight of carbon black The melt flow index (MFI) as used here is determined in accordance with DIN EN ISO 1133 at a temperature of 230° C. and, respectively, 190° C. with a load of 2.16 kg. The terms melt flow index (MFI) and melt flow rate (MFR) are used synonymously.

TABLE 1

| Constituents | Unit | 1(I) | 2(C) | 3(I) | 4(C) | 5(I) |
| --- | --- | --- | --- | --- | --- | --- |
| TPV | Pts. by wt. | 20 | 40 | 40 | 20 | 33.3 |
| HMS PP | Pts. by wt. | 20 | 40 | 20 | 40 | 33.3 |

TABLE 1-continued

| Constituents | Unit | 1(I) | 2(C) | 3(I) | 4(C) | 5(I) |
|---|---|---|---|---|---|---|
| LDPE | Pts. by wt. | 60 | 20 | 40 | 40 | 33.3 |
| Pigment | Pts. by wt. | 1 | 1 | 1 | 1 | 1 |
| Stabilizer | Pts. by wt. | 2 | 2 | 2 | 2 | 2 |
| Blowing agent | Pts. by wt. | 2 | 2 | 2 | 2 | 2 |
| Foam properties | | | | | | |
| Thickness | mm | 1.07 | 1.09 | 1.04 | 0.93 | 0.9 |
| Density | kg/m$^3$ | 621 | 561 | 647 | 590 | 643 |
| Longitudinal tensile strength at 20° C. | N/mm$^2$ | 8.57 | 9.81 | 7.56 | 10.93 | 8.92 |
| Transverse tensile strength at 20° C. | N/mm$^2$ | 7.83 | 8.77 | 6.7 | 8.1 | 7.44 |
| Longitudinal tensile strain at break at 20° C. | N/mm$^2$ | 121 | 102 | 126 | 36 | 87 |
| Transverse tensile strain at break at 20° C. | N/mm$^2$ | 23 | 55 | 57 | 19 | 32 |
| Longitudinal tensile strength at 85° C. | N/mm$^2$ | 2.49 | 5.14 | 2.3 | 5.26 | 3.68 |
| Transverse tensile strength at 85° C. | N/mm$^2$ | 2.27 | 4.16 | 2.19 | 3.72 | 2.86 |
| Longitudinal tensile strain at break at 85° C. | N/mm$^2$ | 300 | 823 | 229 | 926 | 539 |
| Transverse tensile strain at break at 85° C. | N/mm$^2$ | 109 | 481 | 219 | 228 | 234 |
| Longitudinal tensile strength at −35° C. | N/mm$^2$ | 13.6 | 20.9 | 18 | 22.4 | 17.6 |
| Transverse tensile strength at −35° C. | N/mm$^2$ | 13.07 | 20.3 | 14.2 | 16.6 | 16.3 |
| Longitudinal tensile strain at break at −35° C. | N/mm$^2$ | 10.6 | 13 | 11.1 | 7.9 | 10.5 |
| Transverse tensile strain at break at −35° C. | N/mm$^2$ | 9.5 | 8.1 | 6.1 | 4.9 | 8 |
| Falling-ball test at −35° C. | | unacceptable | unacceptable | acceptable | unacceptable | unacceptable |
| Stretching up to 300% | | acceptable | acceptable | acceptable | acceptable | acceptable |

It can be seen from the table that although all of the films are thermoformable, the foam compositions 1(I), 3(I) and 5(I) exhibit reduced and significantly closer values for tensile strain at break and for tensile strength in, respectively, longitudinal and transverse direction, in particular at high and low temperatures. The effect of these closer values is that it is possible to achieve very successful opening of a rectangular airbag flap requiring both longitudinal and transverse fracture of the laminate. The values are also at a level permitting the above. The values for the comparative mixtures are in contrast very different in longitudinal direction and in transverse direction, and in particular at 85° C. the directional differences are extremely large. An airbag flap cannot open as required.

The composition 3(I) moreover leads to a film featuring good low-temperature flexibility, verified by the falling-ball test at −35° C.

What is claimed is:

1. A thermoforming process for producing a film laminate, the process comprising:
   providing a compact decorative layer comprising a lacquer layer on an upper side, wherein the compact decorative layer further includes an underside;
   applying a foamable layer directly on the underside of the compact decorative layer, wherein the foamable layer is based on a polymer composition comprising:
   a) from 15 to 60 parts by weight of at least one thermoplastic vulcanizate (TPV), wherein the at least one TPV comprises a thermoplastic phase and a vulcanized elastomer phase;
   b) from 15 to 35 parts by weight of at least one high melt strength polyolefin (HMS polyolefin);
   c) from 30 to 60 parts by weight of at least one low density polyethylene (LDPE); and,
   d) a chemical blowing agent;
   wherein proportions of a), b), c) and d) are a total of 100 parts by weight; and wherein the vulcanized elastomer phase of the at least one TPV serves as a phase disruptor that minimizes flow behavior of at least the HMS polyolefin and the LDPE with respect to each other;

thermoforming the film laminate, wherein the foamable layer is transformed to a foam layer, and wherein the density of the foam layer is less than 800 kg/m³; and, crosslinking the film laminate.

2. The thermoforming process as claimed in claim 1, wherein the foamable layer is based on a polymer composition comprising:
   a) from 35 to 45 parts by weight of the at least one thermoplastic vulcanizate (TPV),
   b) from 15 to 25 parts by weight of the at least one high melt strength polyolefin (HMS polyolefin); and,
   c) from 35 to 45 parts by weight of the at least one low density polyethylene (LDPE).

3. The thermoforming process as claimed in claim 1, wherein the at least one high melt strength polyolefin is a high melt strength polypropylene.

4. The thermoforming process as claimed in claim 1, wherein the thermoplastic phase of the TPV is based on polypropylene and the vulcanized elastomer phase of the TPV is based on ethylene-propylene-diene elastomer (EPDM), and wherein the at least one thermoplastic vulcanizate comprises the ethylene-propylene-diene elastomer (EPDM) in an amount of at least 70% by weight.

5. The thermoforming process as claimed in claim 1, wherein the foamable layer is based on a polymer composition which comprises a solid chemical blowing agent.

6. The thermoforming process as claimed in claim 1, wherein the lacquer layer has a thickness less than 10 pm, wherein the compact decorative layer has a thickness from 0.2 to 0.7 mm, and wherein the foam layer has a thickness from 0.5 to 2.0 mm.

7. The thermoforming process as claimed in claim 6, wherein the compact decorative layer has a thickness from 0.4 to 0.6 mm, and wherein the foam layer has a thickness from 0.8 to 1.5 mm.

8. The thermoforming process as claimed in claim 1, wherein the density of the foam layer is more than 500 kg/m³ and less than 800 kg/m³.

9. The thermoforming process as claimed in claim 1, wherein the density of the foam layer is from 500 kg/m 3 to 700 kg/m³.

10. The thermoforming process as claimed in claim 1, wherein after crosslinking the film laminate the film laminate is devoid of lines of weakness.

11. The thermoforming process as claimed in claim 1, wherein during the thermoforming, the film laminate is stretched up to 300%.

12. The thermoforming process as claimed in claim 1, wherein the compact decorative layer is a layer of plastics material.

13. The thermoforming process as claimed in claim 1, wherein an underside of the foam layer includes an adhesive layer.

14. The thermoforming process as claimed in claim 13, wherein the film laminate is attached to a carrier by the adhesive layer on the underside of the foam layer.

15. The thermoforming process as claimed in claim 1, wherein an underside of the foam layer includes a primer.

16. The thermoforming process as claimed in claim 15, wherein the film laminate is attached to a carrier by the primer on the underside of the foam layer.

17. The thermoforming process as claimed in claim 1, wherein the film laminate is used for the coating of components for the interior trim of motor vehicles, in particular at least in the region of the airbag covers or in the region of the tear seams of the airbag covers.

18. The thermoforming process as claimed in claim 1, wherein the film laminate is used for an interior trim part for motor vehicles, the interior trim part being a dashboard.

19. The thermoforming process as claimed in claim 1, wherein the film laminate is arranged at least in a region of an airbag cover and/or in a region of tear seams of the airbag cover.

20. The thermoforming process as claimed in claim 1, wherein the foamable layer is based on a polymer composition comprising
   a) from 35 to 45 parts by weight of the at least one thermoplastic vulcanizate (TPV), wherein the thermoplastic phase of the TPV is based on polypropylene and the vulcanized elastomer phase of the TPV is based on ethylene-propylene-diene elastomer (EPDM);
   b) from 15 to 25 parts by weight of the at least one high melt strength polyolefin (HMS polyolefin), wherein the at least one high melt strength polyolefin is a high melt strength polypropylene; and,
   c) from 35 to 45 parts by weight of the at least one low density polyethylene (LDPE); and
   wherein the density of the foam layer is more than 500 kg/m 3 and less than 800 kg/m³.

* * * * *